Oct. 15, 1968   J. R. COX   3,405,950
TOOL HOLDER
Filed Aug. 23, 1966
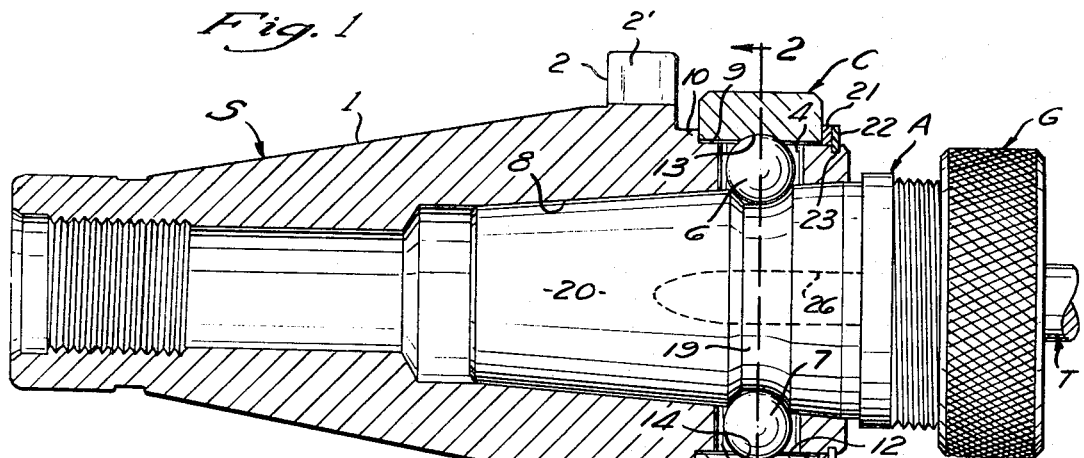
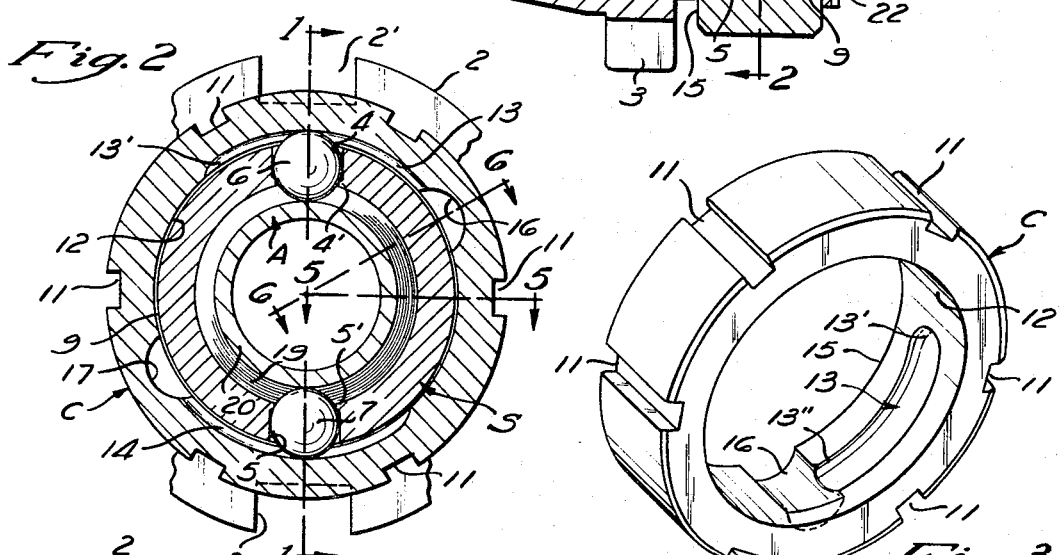
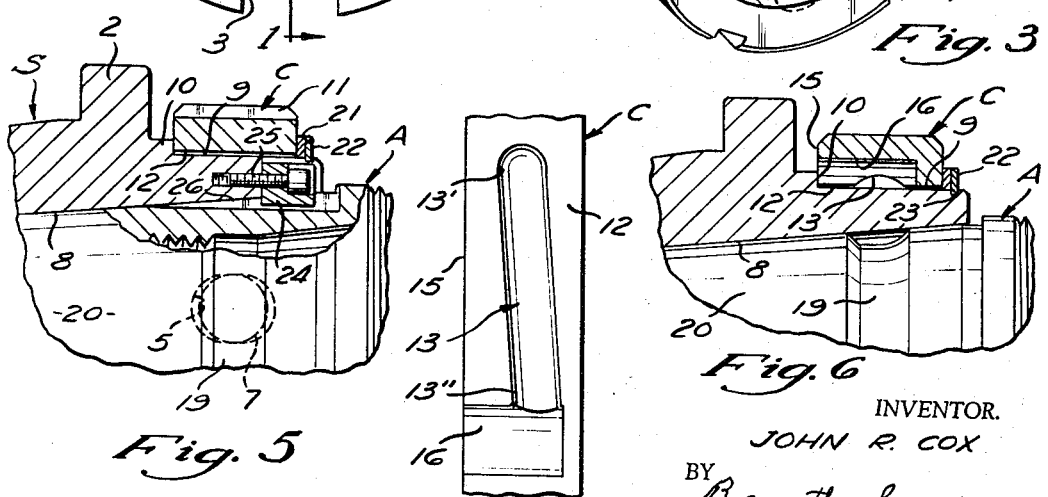
INVENTOR.
JOHN R. COX
BY Bosworth, Sessions, Herrstrom & Knowles
ATTORNEYS United States Patent Office 3,405,950
Patented Oct. 15, 1968

3,405,950
TOOL HOLDER
John R. Cox, Lakewood, Ohio, assignor to Balas Collet Company, Cleveland, Ohio, a corporation of Ohio
Filed Aug. 23, 1966, Ser. No. 574,391
8 Claims. (Cl. 279—103)

This invention relates to tool holders and more particularly to a quick change tool holder for holding the cutting tool in machine tools such as screw machines, milling machines, lathes or the like.

In performing the machining operations that are carried out by the usual machine tools such as milling machines, lathes, screw machines, etc., it is frequently necessary to change from one cutting tool or another either to replace a worn tool or to insert a tool of a different type or size. It is therefore, an object of the present invention to provide a quick change tool holder whereby tools may readily be removed and replaced, which will firmly and accurately hold the tools in the desired position, and which is of rugged construction, long life and require a minimum of upkeep or attention.

To achieve these objects I have provided a tool holder wherein an adapter member, in which the tool proper is firmly mounted by means of a collet or other suitable device, is secured in the tapered bore of a shank member by the action of an actuating ball or balls which engage a groove in the adapter member and which are moved axially, either in tool locking direction or in tool releasing direction, by rotational movement of an actuating collar or sleeve which is rotatably mounted on the shank member. The objects of my invention and the structural arrangement of one embodiment thereof will appear from the accompanying drawings in which:

FIGURE 1 is a longitudinal cross-sectional view through my quick change tool holder, the adapter member being shown in locked or driving position in the shank member.

FIGURE 2 is a transverse cross-sectional view taken substantially on line 2—2 of FIGURE 1.

FIGURE 3 is a detached perspective view of the actuating collar showing the ball actuating groove therein.

FIGURE 4 is a developed view of a portion of the inner wall of the actuating collar showing the ball actuating and ball releasing grooves therein.

FIGURE 5 is a cross-sectional view taken on line 5—5 of FIGURE 2.

FIGURE 6 is a cross-sectional view similar to FIGURE 5 but taken on line 6—6 of FIGURE 2.

The shank or body member S of my tool holder has a tapered conical portion 1 which is adapted to fit in a correspondingly tapered bore in the rotating spindle or other suitable part of the machine tool with which the tool holder is to be used. The driving flange 2 has opposed slots 2' and 3 extending radially inwardly of the member S and positioned to be engaged by corresponding driving means on the machine tool in well-known manner.

An axial bore extends through the body member S and has at its outer (right hand of FIGURE 1) end a conical tapered portion 8 which extends inwardly from the outer end and receives the adapter member A as will be later described. A pair of diametrically opposed axially elongated ball receiving slots 4 and 5 extend through the wall of the body member S adjacent the outer end thereof. These slots have a circumferential width just slightly greater than the diameter of the actuating balls 6 and 7 which are disposed therein.

The inner ends of the slots 4 and 5 are reduced in width as seen at 4' and 5' in FIGURE 2 so that the balls 6 and 7 may project inwardly into the conical tapered bore 8 which extends inwardly from the outer end of body member S and which, as previously explained, receives the adapter member A. As the slots 4 and 5 are of greater axial length than circumferential width the balls 6 and 7, in addition to being movable radially, are also movable axially of the body member S to a limited degree. Due to the reduced inner width of the slots 4 and 5 the balls 6 and 7 cannot drop entirely through into the bore 8 in the body member S when the adapter A is removed.

The outer end of the body member S is formed with a cylindrical portion 9 which extends from its outer end to the shoulder 10 thereon. Mounted for rotary movement on the cylindrical portion 9 of the body member S, with a loose fit providing clearance for purposes to be later described, is the actuating collar C. As best seen in FIGURE 3, this collar C has a plurality of axially extending slots 11 for receiving a spanner wrench or the like which may be used in rotating the collar to effect locking and release of the adapter A in the shank S as will be later explained.

The inner surface 12 of the collar C is formed with a pair of circumferentially extending ball receiving and actuating grooves 13 and 14. As best seen in FIGURES 2 and 3, these grooves 13 and 14 are diametrically opposed and, as illustrated, each extends through about 90° of the circumference of the inner surface 12 of collar C. Also the grooves 13 and 14 are helically inclined relative to a plane normal to the longitudinal axis of the collar C and the body member S when the collar C is assembled thereon. This helical arrangement of the grooves 13 and 14 may be observed in FIGURE 3 where the end 13' of groove 13 is closer to the inner end face 15 of the collar C than is the other end 13" of the groove.

At the ends of grooves 13 and 14 which are most remote from the inner face of the collar C (i.e. end 13" of the collar C) are axially extending grooves 16 and 17 of greater depth than the helical grooves 13 and 14. The slot 16 extends axially from the inner end face 15 beyond the end 13" of the helical slot 13 and stops short of the outer end face of the collar C. The arrangement of the grooves 13 and 16 is also seen in FIGURE 4 which is a developed view of the portion of the inner surface 12 of collar C in which they are cut. It will be understood that grooves 14 and 17 are identical to grooves 13 and 16 but are diametrically opposed thereto in the collar C.

As seen in FIGURE 1, the helical grooves 13 and 14 overlie and receive the outer portions of the balls 6 and 7 respectively. As the grooves 13 and 14 are relatively shallow and contoured in cross-section to fit the balls 6 and 7 they hold the balls in the radial positions seen in FIGURE 2 in which they project inwardly through the slots 4 and 5 into a circumferential groove 19 in the tapered end portion 20 of the adapter A. The collar C is retained on the cylindrical end portion 9 of the body member S by a thrust washer 21 and a split snap ring 22 which fits into a circumferential groove 23 at the outer end of the body S.

Adapter A has at its outer end a collet chuck G, which may be of any suitable type adapted releasably to grip the tool T which may be a drill, reamer, milling cutter or the like.

In order to effect a positive driving connection between the body S and the adapter A a driving lug or key 24

(FIGURE 5) is secured at the outer end of the bore 8 of shank S as by a screw 25 and projects inwardly into the tapered bore 8. The outer conical surface of the tapered end 20 of the adapter A has an axially extending slot or keyway 26 formed therein into which the lug 24 extends and which provides a positive driving connection between the body S and the adapter A.

To assemble the body S, actuating collar C and the actuating balls 6 and 7, the balls 6 and 7 are first inserted into the slots 4 and 5 respectively and the axially extending relatively deep slots 16 and 17 in the collar C are aligned with the portions of the balls which project outwardly beyond the outer surface of the cylindrical portion 9 of the sleeve S. The collar C is next moved axially inwardly (to the left of FIGURE 1) until its inner face 15 engages the shoulder 10 on the collar C. The split thrust and lock washers 21 and 22 are then positioned as shown whereby the collar C is held against axial outward movement on the body S but has free rotary movement thereon.

The balls 6 and 7 are now in the deep axial slots 16 and 17 and they may move radially outwardly until they are completely outside of the tapered bore 8 in the body S. This permissible outward movement of the balls 6 and 7 when the axial slots 16 and 17 are aligned therewith permits the tapered portion 20 of the adapter A to be pushed into the correspondingly tapered bore 8 of the body S until it engages same.

Now when the collar C is rotated in clockwise direction as seen at FIGURE 2 the balls 6 and 7 will move into the helically inclined shallow grooves 13 and 14 respectively and, due to the helical inclination of these grooves, as the collar C is rotated on the body S the balls 6 and 7 will be moved axially inwardly of the body S (to the left in FIGURE 1). As the balls 6 and 7 engage the walls of the circumferential groove 19 in the adapter A this axially inward movement of the balls will cause corresponding axial inward movement of the adapter A into a firmly seated position in the bore 8 of the body S.

The angle of inclination of the helical grooves 13 and 14, and the taper of the portion 20 of adapter A, are such that when the collar C is rotated clockwise to force the adapter A inwardly into the body S the collar C will remain in tightened position until released by positive rotation of the collar C in the opposite (counterclockwise) direction. This counterclockwise releasing movement of the collar C will, due to the inclination of the grooves 13 and 14, cause the balls 6 and 7 to move outwardly of the body S in the slots 4 and 5 and, because they engage the wall of the groove 19 in the adapter A, they will positively release the adapter A and move it outwardly of the tapered bore 8 of the body S.

When the collar C has been rotated in releasing (counterclockwise) direction until the axial grooves 16 and 17 overlie the balls 6 and 7 then, because of the greater depth of the axial slots 16 and 17 relative to the helical slots 13 and 14, the balls may move outwardly beyond the surface of the bore 8 of the body S and the adapter A may be freely withdrawn therefrom.

As previously noted, and as indicated in FIGURES 1 and 2, the actuating collar C has a relatively loose fit on the cylindrical portion 9 of the body S. Clearance is provided between these parts so that, when the collar C is rotated to cause the helical grooves therein to urge the balls 6 and 7 axially of the body S, the collar C will in effect float upon the balls 6 and 7 and exert equal pressure thereon regardless of any slight lack of concentricity which may exist between the bore 8 of the body S, the grooves 19, the actuator member A and the collar C. Furthermore, when the collar C is moved in clockwise direction as seen in FIGURE 2 to grip the actuator in the body the radial outward pressure, which is exerted on the collar C at two diametrically opposed points by the engagement of the balls 6 and 7 in the grooves 13 and 14 will tend to spring the collar C slightly out of round (this movement being possible because of the clearance between collar C and the cylindrical portion 9 of body S) and impose a resilient force on the collar C tending to resist undesired movement thereof in releasing direction (counterclockwise in FIGURE 2).

Although one embodiment of my invention has been illustrated and described in detail herein it will be understood that variations and modifications may be made in the specific form and arrangement of the parts making up my improved tool holder. Accordingly, I do not wish to be limited to the particular device illustrated and described herein but claim as my invention all embodiments thereof coming within the scope of the appended claims.

I claim:

1. A quick change tool holder comprising a body member having a conical tapered bore extending thereinto from one end and being formed with an axially elongated slot extending radially therethrough from the outer surface thereof into said bore, the inner end of said slot being of reduced width, an actuating ball disposed in said slot and of a diameter substantially equal to the circumferential width of said slot, the reduced inner width of said slot preventing said ball from passing therethrough into said bore in said body member, an actuating collar rotatably mounted on said body member and overlying said slot therein and said actuating ball, said collar having a circumferentially extending groove in the inner surface thereof adapted to receive the outer portion of said ball, said groove being inclined relative to a plane normal to the longitudinal axis of said body member, means for restraining said collar against axial movement while permitting rotational movement on said body, an adapter having a tapered end corresponding to and adapted to fit within said tapered bore in said body member and having a circumferential groove formed therein adapted to receive and be engaged by a portion of said ball that extends into said bore of said body member through said slot therein, said inclined groove in said collar having a portion of greater depth at one end thereof whereby, when said portion is aligned with said ball, said ball may move radially outwardly to a position completely out of said groove in said adapter whereby said adapter may be inserted into or withdrawn from said body member, and means on said adapter for securing a tool therein.

2. A quick change tool holder according to claim 1 in which said body member is provided with a second axially elongated slot having a second actuating ball therein, said second slot and ball being circumferentially spaced from said first named slot and ball, and said actuating collar is formed with a second circumferentially extending inclined groove overlying said second ball and having a portion of greater depth at one end thereof.

3. A quick change tool holder according to claim 1 in which said portion of said inclined groove of greater depth comprises a groove extending axially from one end face of said collar across one end of said inclined groove.

4. A quick change tool holder according to claim 2 in which said portions of said inclined grooves of greater depth comprise grooves extending axially from one end face of said collar across one end of the adjacent inclined groove.

5. A quick change tool holder according to claim 4 in which said axially extending grooves are disposed diametrically opposite from each other on the inner face of said collar, extend axially from the inner face of said collar and stop short of the outer face thereof.

6. A quick change tool holder according to claim 2 in which said actuating collar has a loose fit on said body member whereby when said collar is rotated said actuating balls will be engaged thereby with substantially uniform pressure.

7. A quick change tool holder according to claim 2 in which said elongated slots in said body member are diametrically oppositely disposed and in which said inclined grooves in said collar are diametrically opposed and inclined in the same direction whereby when said balls are disposed in said circumferential groove in said adapter rotation of said collar on said shank in one direction will cause said balls to urge said adapter inwardly into said bore of said body member and rotation of said collar in the opposite direction will cause said balls to urge said tool holder outwardly of said bore in said body member.

8. A tool holder according to claim 7 in which said portions of said inclined grooves of greater depth comprise grooves extending axially from the inner end face of said collar across one end of the adjacent inclined groove and stop short of the outer face of said collar.

References Cited

UNITED STATES PATENTS

| | | | |
|---|---|---|---|
| 1,341,934 | 6/1920 | Schoenborn | 279—81 |
| 3,219,355 | 11/1965 | Fujinuma | 279—103 |

FOREIGN PATENTS

| | | |
|---|---|---|
| 894,545 | 4/1962 | Great Britain. |

WILLIAM W. DYER, Jr., *Primary Examiner.*

G. WEIDENFELD, *Assistant Examiner.*